United States Patent [19]
Aiello et al.

[11] Patent Number: 5,515,307
[45] Date of Patent: May 7, 1996

[54] PSEUDO-RANDOM GENERATOR

[75] Inventors: William A. Aiello, Madison, N.J.;
Sivaramakrishnan Rajagopalan,
Boston, Mass.; **Ramarathnam
Venkatesan**, Morristown, N.J.

[73] Assignee: Bell Communications Research, Inc.,
Morristown, N.J.

[21] Appl. No.: 286,161

[22] Filed: Aug. 4, 1994

[51] Int. Cl.$^6$ .................................. G06F 1/02; H04L 9/00
[52] U.S. Cl. ............................................. 364/717; 380/46
[58] Field of Search .............................. 364/717; 380/46, 380/29; 331/78

[56] References Cited

U.S. PATENT DOCUMENTS

| | | | |
|---|---|---|---|
| 5,327,365 | 7/1994 | Fujisaki et al. | 364/717 |
| 5,412,587 | 5/1995 | Holt et al. | 364/717 |
| 5,420,928 | 5/1995 | Aiello et al. | 380/46 |

OTHER PUBLICATIONS

M. Blum, and S. Micali, "How to Generate Cryptographically Strong Sequences of Pseudo-Random Bits," SIAM Journal on Computing, {13} (1984) 850–864.
A. C. Yao, "Theory and Applications of Trapdoor Functions," Proc. of IEEE Symp. on Foundations of Computer Science (1982), pp. 80–91.
Data Encryption Standard (DES), as published by the National Bureau of Standards, Department of Commerce, FIPS, pub 46, Jan. 1977, pp. 653–670.
R. Rivest, "The MD4 Message Digest Algorithm," Advances in Cryptology, Proc. of Crypto 90, Lecture Notes in Computer Science 537, Sprigner Verlag 1991, 303–311.
"The MD5 Message Digest Algorithm," Request for Comments, 1321, Internet Activities Board, Internet Privacy Task Force, Apr., 1992.

*Primary Examiner*—David H. Malzahn
*Attorney, Agent, or Firm*—Leonard Charles Suchyta; James W. Falk

[57] ABSTRACT

A method for generating random bits which is as fast as popular generators and which has provable strong properties. The method makes use of the unpredictability properties of a relatively slow cryptographically strong generator and the rapid mixing properties of random walks on expander graphs. Use of the cryptographically strong generator is typically restricted to a small off-line or a preprocessing step. Subsequent bits are produced with a few register operations per bit. The method and concomitant generator are useful in at least two different types of applications: for faster reliable simulations (or randomizing algorithms), and cryptographic/encryption schemes.

10 Claims, 4 Drawing Sheets

PSEUDO-RANDOM GENERATOR

FIELD OF THE INVENTION

This invention relates generally to pseudo-random bit generators and, more specifically, to circuitry and a concomitant methodology for efficiently generating cryptographically strong pseudo-random bits.

BACKGROUND OF THE INVENTION

A very large number of important processes and methods use an auxiliary input which is assumed to be truly random. Examples of such processes and methods include sorting, simulation and testing of complex systems, encryption, and many other cryptographic primitives. Producing a truly random auxiliary input of sufficient length is difficult. Typically, the auxiliary input is produced by a pseudo-random bit generator. Informally, a pseudo-random bit generator is any process or method which takes a short truly random string and produces a long "pseudo-random" string.

Many pseudo-random bit generators have been proposed and discussed in prior art literature, such as the popular linear congruential bit generator. In evaluating the utility of these bit generators, the conventional approach is to subject each bit generator to a standard regimen of empirical and analytical statistical tests to determine if the generators produce acceptable random bits. Those generators that pass the standard tests are often assumed to produce sufficiently good pseudo-random bit streams for the various purposes for which they are to be employed.

However, this assumption may be erroneous. For instance, it has been shown that the linear congruential bit generator is hardly general purpose since after observing its outputs for a short period, it becomes possible to compute the future outputs correctly. As another example, Monte Carlo simulations of a well-known physical system were recently shown to give results far from the known values when several well-known generators were used as input for the simulations.

While certain traditional generators may not be general purpose, they may be sufficient for certain purposes. For example, it has been shown that a few simple bit generators (including the linear congruential) are sufficient, in a rigorous sense, for a few specific applications. In short, there are examples where the traditional generators are known to be sufficient and there are examples where they are known to be insufficient. For all other cases there are no guarantees. Moreover, for complex methods and processes it is unlikely that the traditional generators will ever be proven to produce sufficiently random output.

Most recently, a different approach to pseudo-random bit generation has been developed based on the theory of "one-way" functions. For the immediate discussion, a one-way function is a function that is easy to compute but hard to invert on an overwhelming fraction of its range. With this notion in mind, a "cryptographically strong pseudo-random (CSPR) bit generator" is a generator that takes a short, truly random seed as input, then repeatedly uses a one-way function to produce a long pseudo-random string of bits such that there is no feasible technique or procedure which can distinguish between the outputs of a CSPR bit generator and a truly random string of bits. It is also known that a CSPR bit generator will pass all statistical tests whose running times are small compared to the time required to invert the one-way function. In particular, using CSPR bits rather than truly random bits in test or other application environments whose running times are small with respect to the time to invert a one-way function will not impact on the results in any demonstrable way.

In addition to the many direct applications of CSPR bit generators mentioned previously, these bit generators may be used to compute cryptographically strong pseudo-random functions (CSPR functions). These functions take two parameters, namely, a function index and a function input. For a randomly chosen fixed index, an adversary with no knowledge of the index cannot choose a function input and then predict even a single bit of the resulting function value in a feasible amount of time. This is true even if the adversary has already seen many function values for many function inputs of its choosing.

CSPR functions have several applications. Two important applications are as follows. First, they can be used in a simple protocol for identifying party A to party B over a non-secure channel when A and B share a secret key. The shared key is used as a CSPR function index. B queries any party on the channel claiming to be A with a random function input. Only A will be able to return the correct function value.

Second, CSPR functions can be used to distribute independent random bits to each of the processes in a parallel or distributed computation. A single seed is first broadcast to each process. This shared seed is used as the CSPR function index. Using its process identification number as a function input, each process computes a CSPR function value as its random seed. Each process may now use this seed and a CSPR bit generator to compute CSPR bits for its own use.

As indicated above, random number generators take a short random seed and produce a long sequence of pseudo-random numbers. In the Information Theoretic sense, correlation between the numbers generated by any such generator is inevitable and the issue of interest therefore is how this correlation affects their use. The shortcomings of prior art generators applied to the two important areas briefly discussed above, namely, Simulations (Randomized Algorithms), and Cryptography are further elucidated below.

Many simulations in engineering and scientific applications expect the generator to produce a sequence of uniformly distributed integers. Here the user is faced with a cyclic problem of estimating an unknown quantity to a great accuracy using simulations whose efficacy is unknown. Often the user does not have the "closed form" solution or alternative methods to verify the estimate obtained from simulations. To gain an indication of the quality of a generator, one may use standard randomness tests, but this is no guarantee that any new test will also be passed. Generators are usually characterized by their cycle lengths and possess some pair-wise independence properties in their outputs. Not much more can be proved in most cases. It would be valuable to have a fast generator with more provable properties.

The intuitive notions related to cryptographically strong generators have been formally well analyzed in the past decade starting with pioneering works of M. Blum, and S. Micali, titled "How to Generate Cryptographically Strong Sequences of Pseudo-Random Bits," SIAM Journal on Computing, {13} (1984) 850–864 and A. C. Yao entitled "Theory and Applications of Trapdoor Functions," as published in the *Proc. of IEEE Syrup. on Foundations of Computer Science* (1982), pages 80–91. However, such generators are prohibitively slow in software. Besides, the constructions preserve security in a weak sense and only asymptotically (i.e. only for large enough seeds/keys) and the overhead in achieving a given security, say $2^n$, can be enormous and require keys of length $n^2$ or $cn$, $c \gg 1$.

Often, high-speed cryptographic applications need a long string of random numbers, which can not be produced quickly enough directly from physical devices. Examples are One-Time Pad encryption, digital signatures, Bit-Commitment protocols, authentication schemes, or Zero-Knowledge protocols. The security of these applications can be compromised if the random strings are cryptographically weak. The art is devoid of teachings or suggestions for using relatively slow generators potentially within a preprocessing step to. generate a short but high quality random string of bits, and then producing many pseudo-random bits using only a few register operations (exclusive-OR and shift) per integer output. The slow generator may be based on cryptographic methods or may be from physical sources of noise, e.g. Zener diodes.

SUMMARY OF THE INVENTION

A cryptographically strong pseudo-random bit generator is implemented by circuitry and a concomitant methodology which utilizes a secure block cypher encoder as the basis for the generator.

Broadly, in accordance with the present invention, a method for generating an output stream of cryptographically strong pseudo-random bits from an input stream of cryptographically strong pseudo-random bits uses the input stream initially to form a matrix of bits. The input stream is then utilized to form a seed for use later by a graph processor. Next, a set of bits is selected from the input stream; this set of bits is used to select rows from the matrix and the selected rows are bitwise exclusive-OR'ed to produce a matrix bit stream. Another set of bits is then formed from the input stream; this set of bits is used to determine a graph bit stream using an expander graph process. The initial graph bit stream is derived as a neighbor of the seed, with each subsequent graph bit stream being obtained as a neighbor of each previous graph bit stream. Finally, the output stream is formed as the the bitwise exclusive-OR of the matrix bit stream and the graph bit stream. Each subsequent output stream is determined by forming a new matrix bit stream and graph bit stream by alternately selecting corresponding sets of bits from the input bit stream.

The methodology to generate the output bits uses two processes, designated $P_0$ and $P_1$ corresponding to the matrix process and the graph process, respectively, and whose outputs are exclusive-OR'ed bitwise, thereby inheriting many desired properties of both. The process $P_1$ is a rapidly mixing random walk on an expander (or a hypercube). This process minimizes long term dependencies or correlations in the output sequence, but in the short term, $P_1$ is not as good. It is very likely to return to a number it had output earlier, although over a long stretch this is very unlikely. On the other hand, $P_0$'s outputs are almost k-wise independent: knowing $x_1, x_2, \ldots, x_{k-1}$ output by process $P_0$, one cannot guess $x_k$ with noticeable facility. This makes it attractive for use in encryption. The process $P_0$ starts with a random matrix R with n-bit rows and outputs a sequence which is the bitwise exclusive-or of a random k sized subset of the rows of the matrix. The process $P_1$ provides the property that N points generated with this generator would fall in any fixed $\mu$-sized set A very close to $\mu N$ times with very high probability that a deviation of $\gamma$ from mean $\mu N$ will occur only with probability $e^{-o(\gamma^2/N)}$, very close to the probability when the points are chosen with purely random bits. This makes it suitable for multidimensional Monte-Carlo tests.

A feature of the present invention is that it is based on cryptographically strong generators that produce sequences that can not be distinguished from truly random ones by any algorithm without consuming an "infeasible" amount of time. One implication of such a strong property is that feasible simulations using cryptographically strong generators are guaranteed to behave almost as if they are using real random input and, hence, these generators are ideal for simulations.

The organization and operation of this invention will be understood from a consideration of the detailed description of the illustrative embodiment, which follows, when taken in conjunction with the accompanying drawing.

DETAILED DESCRIPTION

1.) Overview

In this section, the relevant cryptographic primitives necessary to describe the generator and its properties, in accordance with the present invention, are defined. A basic cryptographic primitive is a One-Way function, defined as: with an overwhelming probability over a randomly chosen x of length n, given $y=f(x)$, no algorithm running in time $n^{o(1)}$ can find an inverse $z \in f^{-1}(y)$. The security s(n) of a function is the minimum time required by any algorithm to invert f(x) for almost all x. One-Way functions are assumed to have security of the form $2^{\epsilon n}$ or $2^{n^\epsilon}$ for some constant $\epsilon$. We say that s(n) is infeasible and that any probability of the form $1/s(n)$ (or smaller)is negligible.

A cryptographically strong pseudo-random generator (or strong generator for short) G accepts a short random seed x and produces $G(x)=b_1, b_2, \ldots, b_{|x|^c}$. Then, any algorithm A with running time T(n) cannot predict $b_i$, after seeing $b_1, b_2, \ldots, b_{i-1}$, with probability better than $\frac{1}{2}+T(n)/s(n)$. Given a One-Way Permutation of security s(n), it is known how to construct a strong generator with security $s(n)/n^c$, for a small c.

A cryptographically strong pseudo-random bit generator G accepts a random seed x of length X and outputs a longer bit string y of length $Y=X^{o(1)}$ and the output distribution is pseudo-random. This means that even a single bit of y cannot be predicted by looking at other bits of y.

Whereas the most recent realizations disclosed in the prior art to configure cryptographically-strong pseudo-random bit generators utilize One-Way functions, the subject matter in accordance with the present invention is based on a block cypher encoder—such an encoder may be realized via the Data Encryption Standard (DES), as published by the National Bureau of Standards, Department of Commerce, FIPS, pub 46, January, 1977, or cryptographic hash functions like MD4 and MD5 (R. Rivest, "The MD4 message digest algorithm", Advances in Cryptology, Proc. of Crypto 90, Lecture Notes in Computer Science 537, Springer Verlag 1991, 303–311, and "The MD5 message digest algorithm", Request for Comments, 1321, Internet Activities Board, Internet Privacy Task Force, April, 1992). DES has a reasonably fast implementation and is commercially available; for example, device type VM009 available from the VLI Technology Inc. of Tempe, Ariz. implements DES. A block cypher encoder takes as input a random key k and an input string x of size X to produce an output string of size X. For a fixed key k, the output y of a block cypher encoder, denoted F(k,x), is a permutation.

2.) Front-end of the Generator ($G_1$)

Figure 1:
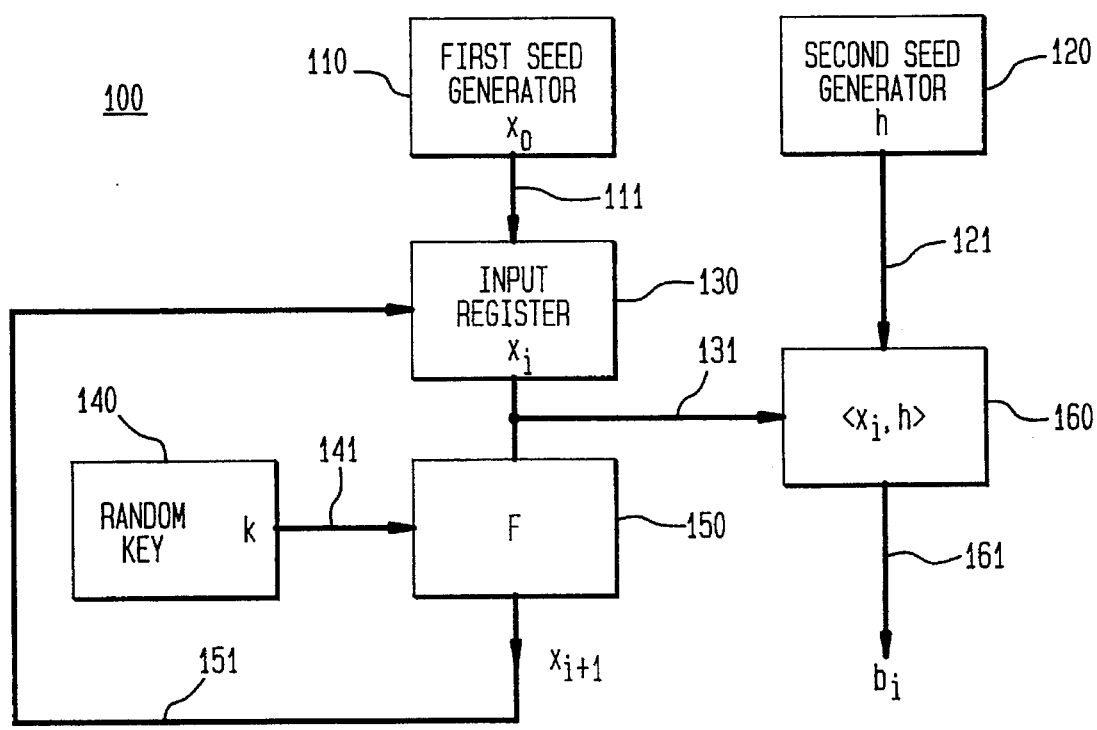
FIG. 1 is a block diagram of a cryptographically strong pseudo-random front-end bit generator utilized to produce a series of cryptographically strong pseudo-random bits to fill in the matrix and which serve as inputs to the matrix processor and the graph processor.

As alluded to in the Overview, the generators of the present invention are made practical by basing them on "block cyphers" encoders. One manner in which a block cypher encoder is used as a fundamental component, namely, the so-called front end generator 100 ($G_1$) of the cryptographically strong pseudo-random bit generator (G) in accordance with the present invention, is set forth with reference to FIG. 1. In FIG. 1, a serial block cypher encoder is depicted by element 150; the One-Way function effected by block cypher 150 is denoted F. A fixed random key m, provided by random key generator 140, serves as one input to block cypher encoder 150 via bus 141. The other input to block cypher encoder is provided via bus 131 from an input register 130, which is shown as providing a set of bits denoted $x_i$ on output bus 131. Input register 130 has two inputs, namely, the first seed $x_0$ as provided by first seed generator 110 over bus 111, and the output of block encoder 150, denoted $x_{i+1}$, as provided by feedback bus 151. Input register 130 operates so that $x_i$ is first assigned the value $x_0$, whereas any the subsequent value of $x_i$ is provided by overwriting the last value of $x_i$ with the updated value $x_{i+1}$. The input $x_i$ to encoder 150 also serves as one input to inner product device 160, also via bus 131. In addition, inner product device 160 has as an input, via bus 121, the second seed h produced by second seed generator 120. In general, the length of the first and second seeds are the same. The length of the random key does not need to be the same length as the first and second seeds; the size of the random key usually depends on how the block cypher works. Inner product device 160 determines an inner product, represented by $<x_i, h>=b_i$, as follows: (a) compute the bitwise AND of $x_i$ with h; and (b) output as the inner product result the parity of all bits from the bitwise ANDing, that is, output a 0 if there are an even number of one bits, and a 1 if there are an odd number of one bits. Each $b_1$ bit is sequentially provided on output lead 161. (As an aside, there are other realizations of generator $G_1$ which may be used in place of generator 100 of FIG. 1; these other realizations have been disclosed in Aiello venkatesan U.S. patent application Ser. No. 08/186, 208, filed Jan. 25, 1994 assigned to the same assignee as the present invention now U.S. Pat. No. 5,420,928, issued may 30, 1995).

3.) The Generator

The generator G of the present invention is now formally defined. It is assumed that a pseudo-random generator $G_1$ is given (such as generator 100 of FIG. 1) which is cryptographically strong. Thus the given is $G_1$, a cryptographically strong generator with given seeds x, h, and m, and output bit stream $b_i$. All the "random" bits that G takes as input are generated by $G_1$. (It should also be realized that the discussion is also true for a generator that produces weakly random bits).

Figure 2:
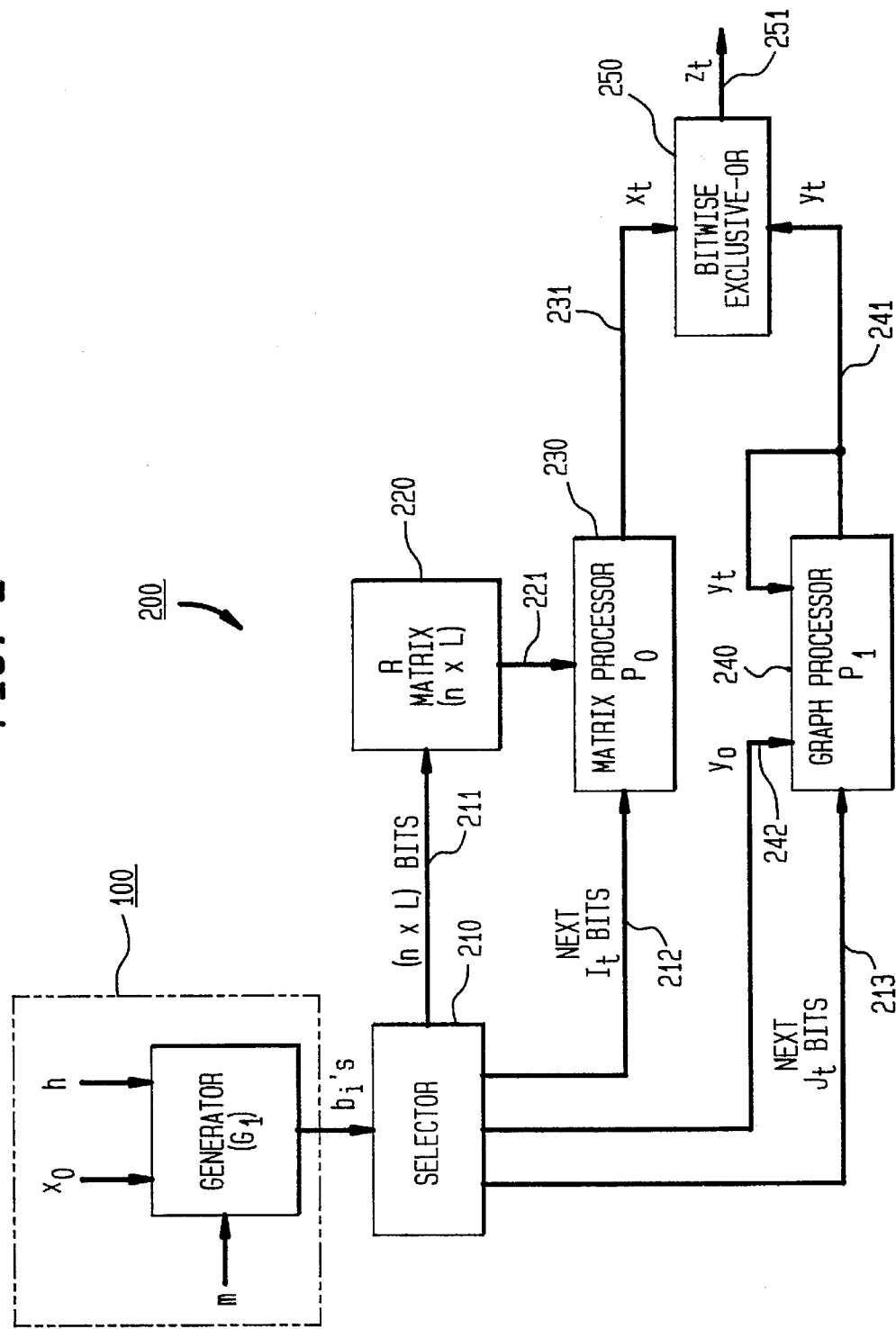
FIG. 2 is a block diagram of an cryptographically strong random bit generator in accordance with the present invention which utilizes the front-end generator of FIG. 1.

The generator G is characterized by four parameters, namely, n, L, k, and d, and is a composition of two processes $P_1$ and $P_0$ described below. The outputs of $P_1$ and $P_0$ are sequences of L-bit strings $x_1, x_2, \ldots$, and $y_1, y_2, \ldots$ respectively. The output of the generator is simply $z_1, z_2, \ldots$, where $z_i = x_i \oplus y_i$ (bitwise exclusive-or). A block diagram 200 of generator G is shown in FIG. 2. Generator $G_1$ (reference numeral 100) is shown as providing a string of bits $b_i$'s to selector 210. The first (n×L) bits are directed to matrix store 220 via lead 211 for storing the (n×L) bits as a matrix, designated R, having n rows and L columns; the rows of R are labeled as R(1), R(2), ..., R(n). The next L bits from selector 210, called $Y_0$, serve as input to graph process 240 via lead 242—the utility of $Y_0$ is described below. Then selector 210 alternates between supplying: a bit stream to matrix processor 230 on lead 212, called stream $I_t$; and a bit stream to graph processor 240 on lead 213, called stream $J_t$. Matrix processor 230 implements a process, designated $P_0$, and graph processor 240 implements a process, designated $P_1$, each of which is discussed in detail below.

The process $P_0$ takes as a parameter an integer k, $1 \leq k \leq n$, and a n×L matrix R 220 with the random bit entries. Process $P_0$ chooses, at random, k rows of n×L matrix R 220, and then computes their bitwise exclusive-or and outputs the resulting L-bit matrix output string, designated $x_t$, on lead 231.

Process $P_0$: Given matrix $R=M_{n \times L}$ filled with random bits.
To generate $x_t$, t=1,2, ...
1) choose at random k rows $w_1, w_2, \ldots, w_k$ of the matrix R; and
2) $x_t$=the bitwise exclusive-or of $w_i$, i=1,2, ..., k.

Figure 3:
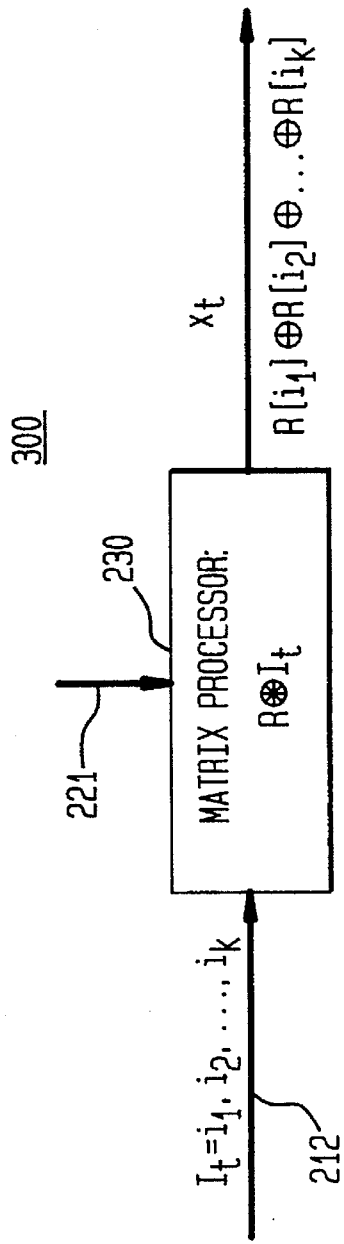
FIG. 3 is a block diagram of the matrix processor of FIG. 2.

The process $P_0$ is depicted by block diagram 300 in FIG. 3. Lead 212 delivers $I_t=i_1, i_2, \ldots, i_k$, that is, k random bit streams each log n bits in length. Then, k rows of the matrix R are selected based on the k random bit strings. For instance, $w_1=R[i_1], w_2=R[i_2], \ldots$, and $w_k=R[i_k]$. The output of matrix processor 240, namely, $x_t$, appears on lead 231 and serves as one input to bitwise exclusive-OR device 250.

Figure 5:
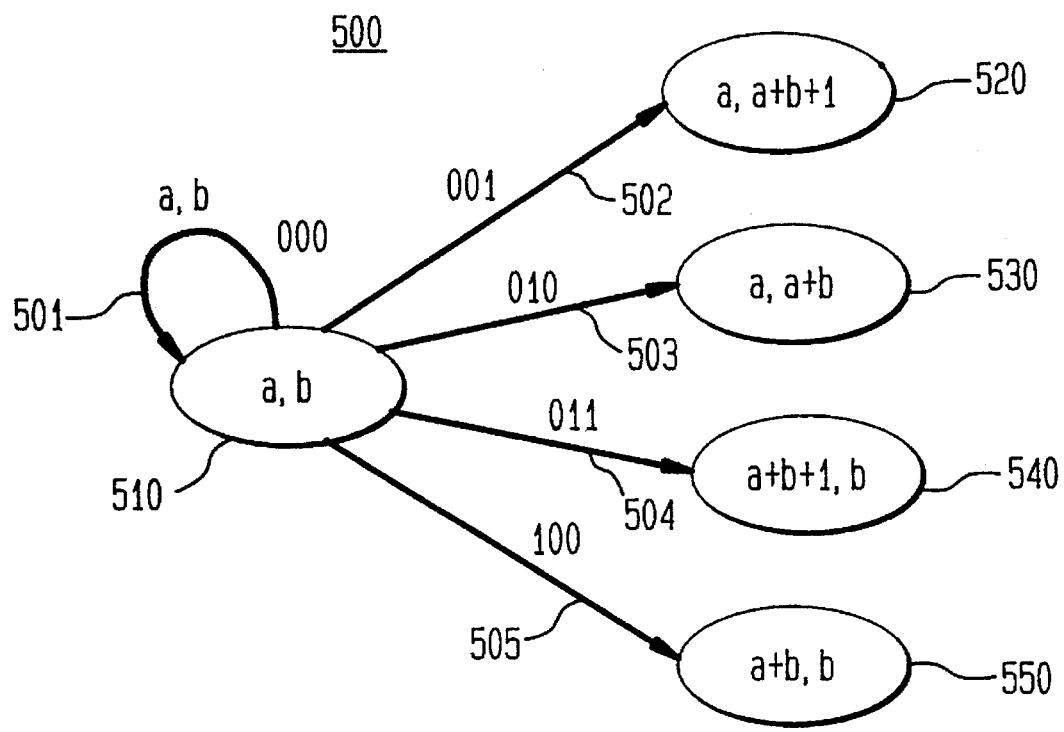
FIG. 5 is a state diagram showing the neighbor nodes in the graph processor on a 5-regular expander graph.

The process $P_1$ takes as a parameter a small integer d which is the degree of any node $Y_t$ on an expander graph having $2^L$ nodes (discussed shortly with reference to FIG. 5).

Process $P_1$: Given d-Regular graph $G_d$ on $2^L$ vertices.
1) choose randomly $Y_0$ in $G_d$; and
2) to generate $Y_j$, j=1,2, ..., let $Y_j$=a random neighbor of $Y_{t-1}$.

Figure 4:
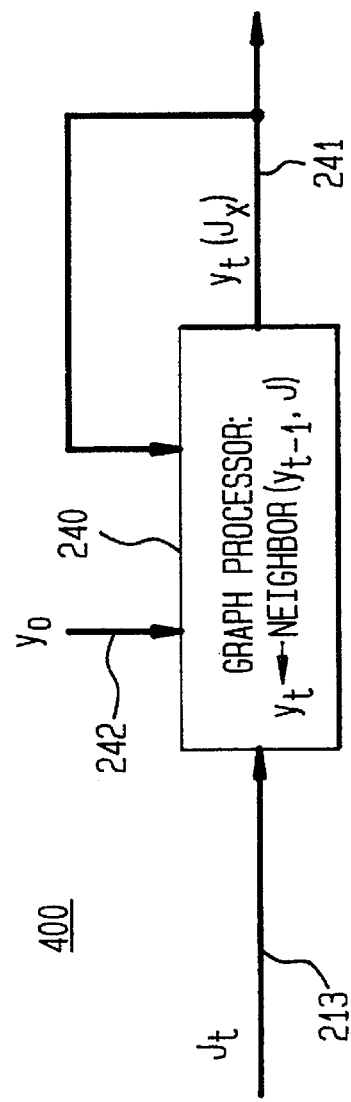
FIG. 4 is a block diagram of the graph processor of FIG. 2.

The process $P_1$ is depicted by block diagram 400 in FIG. 4. The first node under consideration has the label $Y_0$, as provided to graph processor 240 by selector 210. Each subsequent node has the label provided by the output $Y_t$ of graph processor 240, that is, the graph output stream from graph processor 240 appearing on lead 241 is fed back to graph processor 240 for additional processing; $Y_t$ also serves as the second input into bitwise exclusive-OR device 250.

Process $P_0P_1$: $z_t = x_t \oplus y_t$, t=1,2, ...

As indicated above, the process $P_1$ utilizes an expander graph which may be any expander graph including the following two kinds. The first is the expander graph which is either a 5-regular graph with the neighborhood rule (a,b)∈ $\{0,1\}^L$ is connected to (a,b), (a,a+b+0.5±0.5), and (a+b+0.5±0.5,b) or a 7-regular graph with the neighborhood rule, (a,b), (a+2b,b), (2a+b,b), (a,2a+b+0.5±0.5), and (a+2b+ 0.5±0.5,b). The second is the L-dimensional hypercube G'.

As an example of one type of node mapping for an expander graph, reference is made to the state diagram 500 of FIG. 5. Node 510 is the node under consideration, that is, $Y_{t-1}$, and the object is to determine the next node which will serve as the output $Y_t$ of graph processor 240. Presuming there are $2^L$ nodes, then each node may be uniquely identified by a L-bit string. It is supposed that the L-bit string is such that L=2i and is partitioned into an upper half or front half, called a, of length i bits, and a lower half or back half, called b, of length i bits. Then a random integer d=0 causes traversal of the self-loop 501, that is, the neighbor node is actually the present node. On the other hand, if d=1, then the neighbor node is reached by traversing path 502, where the neighbor node is expressed as (a, a+b+1), that is, the upper half is given by the original a, but the lower half is now given by (a+b+1). Similarly, d=2, . . . , 4 leads to nodes given by expressions in nodes 530, . . . , 550, respectively.

4.) Example of Typical Parameters

The parameters that have been defined above are n, L, k, and d. A typical set of values for these parameters is as follows: $n=2^{16}$, L=256, k=3, and d=5 or 7, depending on the expander graph node selection processes. Accordingly, $G_1$ provides ($2^{16}$×256) bits to the R matrix, and $Y_0$, of length 16 bits, to graph processor 240, then alternately (k×[length of j])=(3×16) bits to matrix processor 230, and three bits for d (that is, three bits are needed to express either the integer 5 or the integer 7). It is worthwhile to note that 51 bits (48 bits for the three k's and 3 bits for d) have been required for the generation of 256 random bits (each z), which leads to an "bit expansion ratio" of approximately 5 (256/51).

It is to be understood that the above-described embodiment is simply illustrative of the principles in accordance with the present invention. Other embodiments may be readily devised by those skilled in the art which may embody the principles in spirit and scope. Thus, it is to be further understood that the circuit arrangements described herein are not limited to the specific forms shown by way of illustration, but may assume other embodiments limited only by the scope of the appended claims.

What is claimed is:

1. A method for generating an output stream of cryptographically strong pseudo-random bits from an input stream of either cryptographically strong pseudo-random bits or weakly random bits, the method comprising the steps of (a) forming a matrix of bits from the input stream, (b) forming a seed from the input stream, (c) selecting a first set of bits from the input stream, using the first set to select rows from the matrix and bitwise exclusive-OR'ing the selected rows to generate a matrix bit stream, (d) selecting a second set of bits from the input stream, using the second set to generate a graph bit stream, the initial graph bit stream being obtained from a neighbor of the seed, with each subsequent graph bit stream being obtained from a neighbor of each previous graph bit stream, and (e) generating the output stream as the bitwise exclusive-OR of the matrix bit stream and the graph bit stream.

2. A method for generating an output stream of cryptographically strong pseudo-random bits from an input stream of either cryptographically strong pseudo-random bits or weakly random bits, the method comprising the steps of (a) forming a matrix of bits from the input stream, (b) forming a seed from the input stream, (c) selecting a first set of bits from the input stream for processing by a matrix processor, the matrix processor having the matrix of bits and the first set of bits as inputs, and causing the matrix processor to use the first set to select rows from the matrix and to generate a matrix bit stream as the bitwise exclusive-OR of the selected rows, (d) selecting a second set of bits from the input stream for processing by a graph processor, the graph processor having the seed and the first set of bits as inputs, and causing the graph processor to use the first set of bits to generate a graph bit stream, the initial graph bit stream being determined from a neighbor of the seed, with each subsequent graph bit stream being determined from a neighbor of each previous graph bit stream, and (e) generating the output stream as the bitwise exclusive-OR of the matrix bit stream and the graph stream.

3. The method as recited in claim 2 wherein the graph processor is based on an expander graph having a number of nodes corresponding to the number of rows of the matrix, and the second set of bits is used as an index to select the neighbor of each previous graph bit stream on the expander graph to produce each subsequent graph bit stream.

4. The method as recited in claim 3 wherein the expander graph is a 5-regular graph with neighborhood rule such that node (a,b) is connected to (a,b), (a,a+b+0.5±0.5), and (a+b+0.5±0.5,b).

5. The method as recited in claim 3 wherein the expander graph is a 7-regular graph with neighborhood rule such that node (a,b) is connected to (a,b), (a+2b,b), (2a+b,b), (a,2a+b+0.5±0.5), and (a+2b+0.5±0.5,b).

6. The method as recited in claim 3 wherein the expander graph is a L-dimensional hypercube G'.

7. The method as recited in claim 2 wherein the matrix is designated by R with R having n rows and L columns, wherein the first set of bits has k elements each log n bits in length, the k elements being designated $i_1, i_2, \ldots, i_k$ and wherein the matrix bit stream is computed as $R[i_1] \oplus R[i_2] \oplus \ldots \oplus R[i_k]$ where R[i] represents the entire i-th row.

8. Circuitry for generating an output stream of cryptographically strong pseudo-random bits from an input stream of either cryptographically strong pseudo-random bits or weakly random bits, the circuitry comprising means, responsive to the input stream, for forming a matrix of bits from the input stream, means, responsive to the input stream, for forming a seed from the input stream, means, responsive to the input stream, for selecting a first set of bits from the input stream, means, responsive to the first set of bits, for selecting rows from the matrix and for bitwise exclusive-OR'ing the selected rows to produce a matrix bit stream, means, responsive to the input stream, for selecting a second set of bits from the input stream, means, responsive to the second set of bits and the first seed, for determining a graph bit stream, said means for determining the graph bit stream including means for evaluating a neighbor of each previous graph bit stream to produce each subsequent graph bit stream, with the initial graph bit stream being determined from said seed, and means, responsive to said matrix bit stream and said graph bit stream, for generating the output stream as the the bitwise exclusive-OR of the matrix bit stream and the graph bit stream.

9. A method for generating successive output streams of cryptographically strong pseudo-bits from an input stream of either cryptographically strong pseudo-random bits or weakly random bits, the method comprising the steps of (a) forming a matrix of bits from the input stream, (b) forming a seed from the input stream, (c) selecting a first set of bits from the input stream, using the first set to select rows from the matrix and bits wise exclusive-OR'ing the selected rows to generate a matrix bit stream, (d) selecting a second set of bits from the input stream, using the second set to generate a graph bit stream, the initial graph bit stream being obtained from a neighbor of the seed, with each subsequent graph bit stream being obtained from a neighbor of each previous graph bit stream, (e) generating the output stream as the bitwise exclusive-OR of the matrix bit stream and the graph bit stream, and (f) returning to steps (c), (d), and (e) to generate successive output streams.

10. A method for generating successive output streams of cryptographically strong pseudo-random bits or weakly random bits, the method comprising the steps of (a) forming a matrix of bits from the input stream, (b) forming a seed from the input stream, (c) selecting a first set of bits from the input stream for processing by a matrix processor, the matrix processor having the matrix of bits and the first set of bits as input, and causing the matrix processor to use the first set to select rows from the matrix and to generate a matrix bit stream as the bitwise exclusive OR of the selected rows, (d) selecting a second set of bits from the input stream for processing by a graph processor, the graph processor having the seed and the second set of bits as inputs and causing the graph processor to use the first set of bits to generate a graph bit stream, the initial graph bit stream being determined from a neighbor of the seed, with each subsequent graph bit stream being determined from a neighbor of each previous graph bit stream, (e) generating the output stream as the bitwise exclusive-OR of the matrix bit stream and the graph bit stream, and (f) returning to steps (G), (d), and (e) to generate successive output streams.

* * * * *